March 18, 1958     T. S. GORTON, JR     2,827,383
METHOD OF SEPARATING FISH MEAT FROM THE
SKELETONS OF PREVIOUSLY FILLETED FISH
Filed July 21, 1953     2 Sheets-Sheet 1
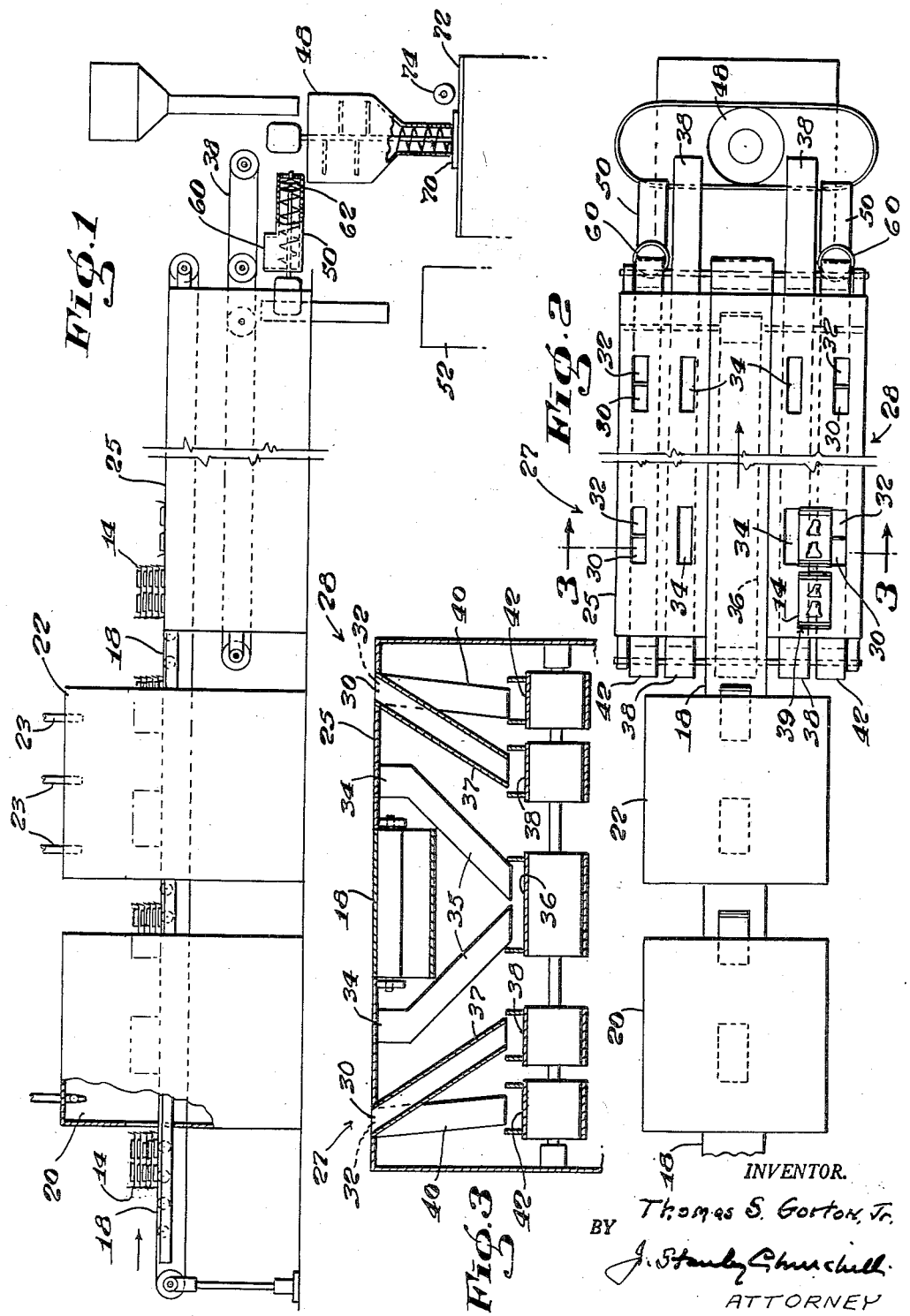
INVENTOR.
Thomas S. Gorton, Jr.
BY
J. Stanley Churchill.
ATTORNEY

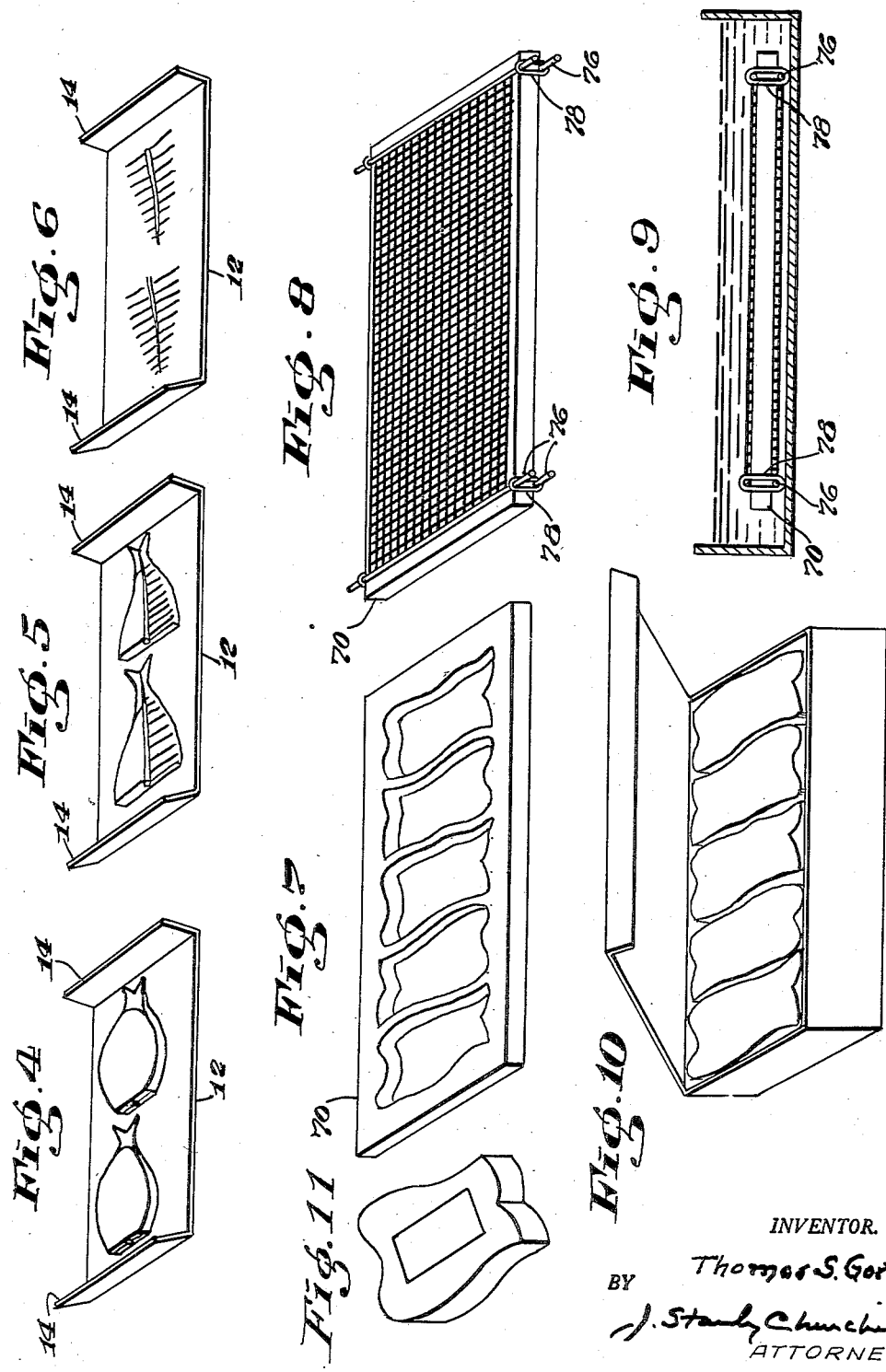

United States Patent Office 2,827,383
Patented Mar. 18, 1958

2,827,383

METHOD OF SEPARATING FISH MEAT FROM THE SKELETONS OF PREVIOUSLY FILLETED FISH

Thomas S. Gorton, Jr., Cambridge, Mass.

Application July 21, 1953, Serial No. 369,334

13 Claims. (Cl. 99—194)

This invention relates to novel sea-food products and to methods of treating fish to produce increased yields of edible fish meat.

Prior to the present invention it has been the generally accepted practice in the marketing of ocean perch or red fish to scale by machine and hand fillet the fish, leaving the skeleton including the head, belly, throat and back of the neck as a waste unit. As a result, experience has shown that the yield of fillets obtained from 100 pounds of round (whole) ocean perch averages about 29%.

One object of the present invention is to provide a novel method of treating fish, and more particularly ocean perch or red fish by which a substantial increase in yield of edible fish meat may be obtained than the average yield of 29% above referred to.

A further object of the invention is to provide a novel method of treating the skeleton of an ocean perch or red fish in the condition in which it is left after the usual machine scaling and hand filleting operations have been performed thereon, to recover from the skeleton the fish meat which clings to the bone structure in a simple, practical and economical manner which lends itself to commercial operation and to effect the separation of the major portion of the thus attached fish meat substantially free from bones, and the separation of the remaining attached fish meat containing some bones. The invention contemplates the conversion of the fish meat portion and bone containing meat portion to an edible product by comminuting the latter portion.

A still further object of the invention is to produce novel fish products in marketable and quick frozen form from the additional yield of fish meat recovered from the skeleton, as will be described.

A still further object of the invention is to produce by a novel sea-food molding process a variety of marketable, quick frozen sea-food products having superior taste and freshness and which may be offered and sold profitably either uncooked or in partially cooked form, as will be described.

With these general objects in view and such others as may appear, the invention consists in the various processes and products hereinafter described and particularly defined in the claims at the end of this specification.

In the drawings I have illustrated more or less diagrammatically suitable apparatus for practicing the present process wherein:

Fig. 1 is a side elevation of a conveyer system by which the fish skeletons are subjected to successive operations of steaming, cooling and separating the fish meat from the skeletons;

Fig. 2 is a plan view of the apparatus shown in Fig. 1;

Fig. 3 is a cross section taken on the line 3—3 of Fig. 2;

Figs. 4, 5 and 6 are perspective views illustrating successive steps in the operation of separating the fish meat from the skeleton;

Fig. 7 is a mold for use in producing a molded fish product;

Fig. 8 illustrates a screen frame for covering the cavities of the mold and which is designed to permit cooking of the fish by a deep frying operation;

Fig. 9 illustrates the mold and frame shown in Fig. 8 submerged in a frying bath;

Fig. 10 illustrates a package containing the molded fish products; and

Fig. 11 illustrates a composite molded sea-food product.

Referring now to the drawings which illustrate more or less diagrammatically suitable apparatus for practicing the present processes and for producing the present seafood products, the red fish are first machine scaled and hand filleted following the usual practice now employed, and in the various operations to be performed in the present process the so-called "skeletons" are handled and treated as food products instead of as waste. Accordingly, after the filleting operation the skeletons will be kept cold and clean during the following steps in the process.

The bellies of the skeletons remaining after the previous scaling and filleting operations above referred to have been opened and cleaned and the heads cut off at the gills leaving the throat and back of the neck as part of the skeletons. As best shown in Fig. 4, the skeletons in the condition thus far described are placed in shallow pans or trays 12, preferably of stainless steel, which have upstanding portions 14 at their ends only. The trays are so constructed that they can be nested one above the other to form stacks and still leave sufficient clearance between the bottom of the overlying trays and the skeletons in the trays below so that the skeletons are not crushed by the weight of the overlying trays. The open sides of the trays greatly facilitate removal of the meat from the skeleton at the picking station as will be described. After a plurality of the skeletons have been placed in the trays and the trays stacked in piles, they are placed upon continuously moving conveyer belt 18 which transports them to and through the different processing stations hereinafter to be described. The skeletons will be placed on flat surfaced stainless steel trays, size 6" by 10". These trays have no sides but with nearly vertical ends on the 6" lengths, the ends being 1¼" high and at a slight out angle so that the trays will nest leaving 1" in the clear. The skeletons will be placed two on each tray and the trays stacked six high in order to handle 12 fish and 6 trays as a unit.

In accordance with the present invention the first step towards the production of the final sea-food products comprises conveying the stacked trays to and through a steam chamber 20 wherein the skeletons are exposed to a short steaming, preferably about 1 minute duration. This short steaming conditions the fish meat adhering to the skeleton so that it may be separated from the bone. Care must be taken to avoid exposing the skeletons to the steam for too long a period of time since the bones may become softened and break away with the meat when it is picked therefrom. Long steaming will also reduce the flavor of the fish, may result in a loss of vitamins and thereby reduce the value of the fish as a nutritious food product. I have found that 60 seconds is an adequate length of time for steaming the meat in order that the meat may become sufficiently loosened from the bone to permit the meat to be combed from between the laterally extended bones of the skeleton.

In order to enable the fish meat adhering to the skeleton to be economically removed and separated from the bone structure of the skeleton, I prefer to utilize a continuously moving conveyer 18 operated at sufficiently slow speed to enable the successive operations of steaming, cooling and separating the fish meat to be performed in a convenient and economical manner. For this purpose, as shown in Fig. 1, the conveyer is arranged to move successive stacks of trays first through a steam chamber, as has been described, and then through a cooling chamber 22 which is refrigerated by any suitable means, and as shown by cold air introduced into the chamber through a series of air pipes 23 in the upper portion of the chamber and through which sufficient cold air may be forced under pressure from a source of supply, not shown, so as to cool the trays and hot skeletons sufficiently to enable them to be handled by operators during the fish separating operation.

As illustrated in Figs. 1 and 2, the conveyer belt is arranged to move along the center of an elongated flat top table 25 forming two side portions 27, 28 on each side of the conveyer belt so as to permit each operator to slide a stack of the trays being delivered by the belt onto the portion of one of the two side portions 27, 28 immediately in front of the operator. It will be understood that a number of operators will be arranged to sit or stand along each side portion 27, 28 of the table, and as illustrated in Fig. 2, a sufficient portion of the table is illustrated so that two operators may sit on each side of the table. Preferably, the portion of the table immediately in front of each operator is provided with three openings: one opening 30 being designed to permit the operator to pass therethrough the bone free fish meat removed from the skeleton; the second opening 32 to permit the operator to slide therethrough those portions of the separated fish meat which contain small bones and require further treatment; and the third opening 34 is designed to receive the bone structure of the skeletons from which meat has been separated, to be conducted through the chute 35 to a discharge or waste conveyer indicated at 36.

In operation the operator slides off one stack consisting of six trays containing the skeletons of twelve fish disposed in units of two fish to each tray arranged in side by side relation, as illustrated in Fig. 4. This stack of trays may be conveniently moved by the operator from the central belt across to a position to the left of the operator such as is illustrated at 39 in Fig. 2, and the operator then lifts off the top tray of the stack and places it on the working space immediately in front of the operator with one side of the tray directly at the inner edge of the two openings 30, 32 and the second side of the tray at the adjacent edge of the opening 34 as shown. With this arrangement the operator may conveniently comb from the central backbone of the skeleton the previously loosened meat and push it from the tray through the proper opening 30, 32. In practice by using an ordinary four-pronged fork, such as an ordinary silver table fork, and with some assistance from the fingers of the left hand the operator separates the meat pieces from the bone structure of the fish, pushing and sliding the best and bone free parts from the pan directly into the opening 30 where the meat falls through the chute 37 onto the conveyor belt 38. Similarly, the operator by means of a fork and with the assistance of the fingers pushes and slides the meat flakes that contain some of the smaller bones which become detached from the skeleton over to the right side of the individual pan at the edge closest to the operator whence this mixture of fish meat and bone may be transferred through the opening 32 in the table and down through the chute 40 to the conveyer 42.

In the preferred operation the operator combs the meat in a direction toward the operator and at substantial right angles to the main part of the backbone, and after this has been done the fish skeletons appear as more or less diagrammatically illustrated in Fig. 5. Most of the bone structure of the fish skeleton comprises laterally extended bones, and this enables the operator to conveniently comb the fish meat by movement of the fork towards her. After this has been done the operator reverses the position of the pan and proceeds to comb out the fish meat from the second side of the fish skeleton. After this has been done the bony skeleton structure remains on the pan more or less in the condition diagrammatically illustrated in Fig. 6.

After the meat has been substantially completely removed from the bone structure of the skeleton, the latter is pushed toward the center of the table and the skeleton disposed through the waste opening 34 and chute 35 to the waste conveyer 36. The tray may then be placed on an empty tray conveyer and carried away to be cleaned and refilled. The operator is now free to select another tray from the stack at his or her left and repeat the process.

After the meat, the meat-bone mixture and the waste have been pushed into their proper chutes and thereby deposited upon the conveyers 38, 42 and 36, respectively, the products are carried by said conveyers to their next destinations. The clear meat may be carried to and deposited in a suitable mixing machine 48 of any known commercial type on the market; the meat-bone mixture is preferably carried to a comminuting machine, indicated generally at 50, to be subsequently mixed with the bone free meat if desired, as will be described; and the waste to a waste container 52.

In accordance with the preferred process the meat-bone mixture passes into the hopper 60 of a worm type comminuting machine of any usual commercial form and is completely ground by rotating cutter blades 62, and thereafter deposited in the mixing machine 48. In this manner the minor amount of bone is cut up into such a fine condition as to render it edible. However, during the comminuting a substantial portion of the fish liquid and natural fish flavor is lost, and I have found that by mixing the clear meat and the comminuted meat together in the mixing machine the natural fish flavor, appearance and consistency is preserved.

In practice during the mixing operation, I prefer to add a bodying filler to the fish mixture in order to give the mixture sufficient body and to assist the same to congeal when frozen and/or cooked. However, the smallest practical amounts of such filler should be added, since too much will destroy the natural fish flavor of the mixture. Various fillers may be used, such as corn flour, soya flour, powdered milk, powdered eggs and others, either separately or in various combinations of any of them. Suitable flavoring may also be added if desired.

In order to impart to the fish meat mixture a superior marketable form, it is preferred to extrude the mixture from the mixing tank 48 under pressure into a mold 70 and to thereby impart a predetermined shape to the mixture. The mold may comprise a metal plate containing a plurality of open cavities of any desired shape, preferably approximating an exaggerated shape of a fish like fillet that will nest and pack tightly so as to compactly fill the ulitmate package. The mold 70 is placed upon a flat surface, such as a stainless steel plate 72 which has previously been covered with a thin coating of breading or like material. When the fish-filler mixture is forced into the cavities by the extrusion and by a presser roller 74, the bottom of each molded portion is forced in contact with and is covered with the breading. After all of the cavities have been filled, the upper surface of the molded mixture is also covered with a layer of breading and the top and bottom of the mold covered with a wire mesh screen which is securely fastened to the mold plate 70 in any suitable manner, as by the rods 76 and clips 78 as shown in Fig. 8. The molded fish-filler mixture is now ready for freezing or partial cooking. The cooking may be done by broiling, baking or frying. In the preferred process the entire mold is lowered into deep fat or oil bath which is preferably maintained at a temperature of about 375° F. for approximately three minutes. I have found that three minutes is a very satisfactory length of time to fry the molded mixture, since the fish and filler congeals sufficiently, and I do not desire to produce a product which is completely cooked although for some purposes this may be desirable. After the partial cooking I remove the molded fish-meat fillets from the mold and allow them to cool and to drain to remove the excess oil or grease therefrom.

In practice I have found that two of the molded fillets produced make a satisfactory serving for one person, and with this in mind they are preferably packaged in one-pound packages of ten fillets each. Preferably, they are arranged in two layers, one above the other, five fillets in each layer. The one-pound packages of molded fillets may then be quick frozen in any well known commercial freezer. I prefer, however, to freeze the packages in a plate froster of a known commercial type now on the market, the pound packages being thereafter packaged in cartons of twenty-four one-pound packages to a carton for distribution.

In its preferred form the present novel fish product is not an "already cooked" product, but a ready prepared "quick" product, and is particularly adapted to be sold in the standard item, low-priced field.

At the present time the yield of food product fillets cut from 100 pounds of round ocean perch is approximately 29% on the average. In accordance with my invention, by utilizing the heretofore discarded skeletons in the manner herein disclosed and making molded fillets, the yield of edible fish product may be increased from about 29% of the raw product to approximately 43–45%. Consequently, the value of the catch to United States fisherman will be increased, and at the same time the price of regular natural fish fillets to the consumer could be reduced.

In a modified method of producing the present molded fillets, the step of mixing a filler with the fish meat may be eliminated since the meat itself is rendered somewhat sticky by the short steaming operation and may be sufficiently compacted when forced into the cavities of the mold and subjected to freezing or partial cooking. When the molded fillets are breaded and subjected to the partial cooking operation, both the breading and cooking assist in enabling the fillets to retain their uniform molded size and shape.

In still another modified method, after the meat has been gleaned from the skeleton in accordance with the operation described in the preferred method, it may be spread out thinly on a large, flat surface, preferably a stainless steel sheet and cut into the desired shape with suitable dies either before or after freezing. Thereafter, the shaped fillets may be breaded and either partially or completely cooked in deep oil or fat, or otherwise, and then packaged and frozen in the same manner as described in the preferred method.

A still further method of producing the present shaped fillet includes the preferred steps above described of steaming, cooling, combing and mixing, and thereafter the mixture is extruded into a pan, tray or carton. The individual molded fillets may be die cut from the mass. The partial frying or cooking step may precede or follow the die cutting. However, in this method the shapes may be frozen either before or after the frying operation, and the fillets are then packaged in the same manner as in the preferred method.

It may readily be seen that the present novel fish product and method of making the same result in a molded fillet which will contain all of the nutrition and flavor of a natural fish fillet and will be additionally attractive to the consumer because of its uniform size, shape and weight. The products of the present invention are particularly adapted for use in hamburger stands, drug stores, and in the smaller restaurants for fish sandwiches and inexpensive plate lunches.

In another modified form of the present method of making a molded fillet, a plurality of the skeletons of previously filleted fish may be placed in a large, flat tray and passed through the steam chamber, in accordance with the method hereinbefore described. However, the plurality of skeletons must remain in contact with the live steam for a period of time which substantially exceeds 60 seconds in order to properly loosen the meat from the bone. In this method the individual skeletons are lifted from the large tray at the picking station and placed in front of the picker. The picking may be accomplished in the same manner as heretofore described. However, the clear meat and the meat with bone may be slid into one chute and carried by the conveyor belt to the comminuting machine. The comminuted meat is then mixed with filler in the mixing machine, as heretofore described. The remaining steps in the method are the same as those described in the preferred method.

While the foregoing is a description of the present novel sea-food product and method of making the same in the form of molded fish fillets, certain aspects of the present method may be utilized to produce various varieties of sea-food products, for example, molded scallops, or molded soft shell clams.

A typical recipe for making molded scallops may contain the following ingredients: 30 pounds of sea scallops, 33 pounds of pollock fillets, 32 pounds of sea clams, quahaugs or skimmers and a small amount of filler and flavoring. The scallops and sea clams are chopped into a relatively coarse mixture by passing them through a chopping machine, not shown, and the pollock fillets comminuted in a comminuting machine into a finely ground paste. Thereafter the scallops and clams and the pollock paste are mixed together in a suitable mixing machine. At this time a predetermined amount of filler and flavoring, preferably corn flour and egg yolks, is added and the entire mixture thoroughly mixed.

In order to mold the mixture into the desired shape, generally that of individual natural scallops, I preferably provide a metal frame, generally rectangular in shape, and which contains a plurality of octagonally shaped open-ended cavities therein which closely resemble the shape of natural scallops. The frame is preferably three-fourths inches deep and the cavities one inch in diameter. The frame is placed upon a flat sheet, preferably of stainless steel, which has a thin coating of breading thereon. The mixture is extruded under pressure into the cavities compactly filling the same, and the exposed top surface of the molded mixture is covered with breading or the like. It will be seen that the bottom surface of the molded mixture is in contact with the breading on the flat sheet, and the top and bottom of the frame covered with wire mesh to hold the mixture in the cavities.

In order to congeal the mixture to enable the individual molded scallop mixture to retain its shape, the entire frame is lowered into deep fat or oil at 375° F. for approximately three minutes to partially cook the same. Thereafter the screens are removed therefrom, the scallops cooled, drained and removed from the molding cavities. The individual molded scallop mixtures are then placed in suitable family size packages and frozen to maintain them in a good condition until used by the consumer.

In order to produce molded soft shell clams for producing New England fried clams, a mixture of clam meats, which may comprise quahaugs, skimmers, or black clams, totalling ninety-five pounds is processed as follows:

Approximately seventy-five pounds of the mixture is chopped in a suitable chopping machine, not shown, to form a relatively coarse minced clam mixture. Twenty pounds of the mixture is comminuted in a comminuting machine to form a finely ground paste. The chopped meat and the paste are then thoroughly mixed in a mixing machine together with approximately two pounds of egg yolks and three pounds of corn flour. After the ingredients are mixed the mixture is placed in suitable molds shaped to enable the products to pack compactly in the final package. In order to form a molded product which closely resembles the typical New England fried clam, I provide a mold comprising a flat, substantially rectangular framework having a plurality of open-ended cavities therein which are shaped in the form of soft shell clams. Preferably, the frame should be approximately three-eighths inch deep, and the shape of the cavities substantially exaggerated in order to obtain molded clams simulating natural clams. The mixture is retained in the molds by a wire mesh which is secured to and covers the top and bottom of the framework and the exposed parts of the molded clams breaded lightly, as heretofore described. The framework is then lowered into deep fat or oil and fried for a limited time, preferably for three minutes at 375° F. to partially cook the same. It will be understood that the frying step is not for the purpose of cooking the mixture but rather to congeal the same in its molded shape, and to enable the shape to be retained during subsequent handling until consumed. The molded clams are removed from the molds, cooled and drained and may be packaged and frozen in the manner heretofore described. The present process involving the use of screens to retain the sea-food mixture in the molds enables the partial cooking to effect the shrinking of the mixture to permit it to be removed from its mold and to retain its predetermined shape so that when subsequently frozen this shape is preserved. If found advantageous utilizing some sea-food mixture, only a bottom screen may be needed. If the mixture is frozen in the mold prior to cooking, it may be possible to avoid the use of screens. Also, if of the necessary consistency and if packed in the mold under sufficient pressure, the screens may be eliminated.

From the description thus far it will be observed that the molded sea-food products may be made in accordance with a series of cooking methods. After preparation of the sea-food mixture and the introduction of the same into the molds the sea-food mixture may be frozen in the molds without being subjected to any cooking either with or without a bodying agent of the character above referred to. Alternately, the sea-food product, after having been placed in the mold, may be partially cooked and then frozen either with or without the bodying agent of the type above referred to. Finally the molded product either with or without a bodying agent may be completely cooked and then frozen.

The above-described methods of separating the fish meat from the bone structure of the skeletons of previously filleted fish are applicable to the skeletons produced by the generally practiced process involving the hand cutting of the two fillets, one from each side of the fish, leaving the skeleton with the head attached. This skeleton is treated to remove the head by a cut just behind the eye, leaving the throat and back of the neck as part of the skeleton. The operation in connection with such skeletons has been previously described.

A further method of commercial operation involves the removal of the head first and subsequent machine filleting of the fish. Preferably, a double cut is made through the head eliminating the forehead, eye and most of the mouth as a waste product and also a cut at the gill portion prior to the introduction of the main body of the fish into the filleting machine. In this manner two separate sections of the complete skeleton may be treated in accordance with the various steps of the present process and its modifications.

As used throughout the claims, the term "skeleton" is intended to define and include the skeletons produced in any of these general methods.

Therefore, it will be observed that a variety of economical and tasty sea-food products in addition to and including those described may be manufactured in accordance with certain aspects of my novel method in a novel, economical and practical manner.

In Fig. 11 I have illustrated the composite molded sea-food product wherein the outer portion may comprise one type of sea food, as for example the fish meat recovered from red fish in accordance with the foregoing process, and the central portion or insert may comprise a different type of sea-food product, such as lobster, shrimp, or the like. The opening for the reception of the insert may be conveniently formed by introducing a suitable spacer in the mold 70 and subsequent filling of the insert after the outer portion of the molded product has been introduced into the mold.

While the invention has as its primary object the recovery and processing of the fish meat from the skeletons of previously filleted fish, and particularly of red fish, nevertheless, the general process of steaming, separating and handling the recovered fish meat may be used with advantage as applied to whole fish which have been beheaded and cleaned.

Having thus described the invention, what is claimed is:

1. The method of separating fish meat from the skeletons of previously filleted fish, comprising the steps of subjecting the skeleton to steam for a short period of time of at least 60 seconds sufficient only to condition and slightly cook the meat to enable it to be easily separated from the bone structure, and then combing the meat from the skelton in a direction toward the sides of the skeleton and away from the main backbone of the skeleton.

2. The method of separating fish meat from the skeletons of previously filleted fish, comprising the steps of subjecting the fish skeleton while supported on the tray to a short steam operation of at least 60 seconds sufficient to slightly cook the fish meat, cooling the skeleton sufficiently to permit handling, then separating the fish meat from the main bone structure of the skeleton by combing the fish meat laterally from the main backbone towards the sides of the skeleton.

3. The method of separating fish meat from the skeletons of previously filleted fish comprising the steps of subjecting the skeleton to a short steaming operation of at least 60 seconds sufficient only to condition and slightly cook the fish meat for easy separation from the bone structure, then combing the fish meat from first one side and then the other side of the skeleton, and turning the skeleton between such combing operations.

4. The method of separating fish meat as defined in claim 3 wherein the removed fish meat that is substantially free of bone and the removed fish meat containing small bones are maintained in separated relation, and wherein the fish meat containing said small bones is subjected to a comminuting operation.

5. The method of separating fish meat as defined in claim 3, wherein all of the fish meat thus separated is subjected to a comminuting operation.

6. The method of separating fish meat from the skeletons of previously filleted fish comprising the steps of subjecting the skeleton to a short steaming operation of at least 60 seconds sufficient only to condition and slightly cook the fish meat for easy separation from the bone structure, then combing the fish meat from the skeleton from the backbone towards the sides, without substantially disturbing the skeleton from its position on the tray.

7. The method of separating fish meat from the skeletons of previously filleted fish comprising the steps of subjecting the skeleton to a short steaming operation of at least 60 seconds sufficient only to condition and slightly cook the fish meat for easy separation from the bone structure, then combing the fish meat from first one side and then the other side of the skeleton, turning the skeleton between such combing operations, then adding to the fish meat thus separated a bodying filler, and subsequently molding the product.

8. The method of separating fish meat from the skeletons of previously filleted fish comprising the steps of subjecting the skeleton to a short steaming operation of at least 60 seconds sufficient only to condition and slightly cook the fish meat for easy separation from the bone structure, then combing the fish meat from first one side and then the other side of the skeleton, turning the skeleton between such combing operations, incorporating a bodying filler in the fish meat thus separated, then introducing the composition into a mold and partially cooking the same while in the mold.

9. The method of separating fish meat from the skeletons of previously filleted fish comprising the steps of subjecting the skeleton to a short steaming operation of at least 60 seconds sufficient only to condition and slightly cook the fish meat for easy separation from the bone structure, then combing the fish meat from first one side and then the other side of the skeleton, turning the skeleton between such combing operations, incorporating a bodying filler in the fish meat thus separated, then introducing the composition into a mold and partially cooking the same while in the mold, then removing the partially cooked molded products from the mold, and subsequently freezing the same.

10. The method of separating fish meat from the skeletons of previously filleted fish comprising the steps of subjecting the skeleton to a short steaming operation of at least 60 seconds sufficient only to condition and slightly cook the fish meat for easy separation from the bone structure, then combing the fish meat from first one side and then the other side of the skeleton, turning the skeleton between such combing operation, then forming the separated fish meat into sheet form and cutting the sheet into shaped portions, and then subjecting the shaped portions to partial cooking and freezing.

11. The method of making a sea-food product of predetermined shape comprising the steps of separating the fish meat from the skeletons of previously filleted fish by steaming the skeletons for at least 60 seconds to slightly cook and enable the fish meat to be recovered therefrom, removing the fish meat from the bone structure of the skeleton, forming a sheet of the recovered fish meat, freezing said sheet then cutting individual shapes from the frozen sheet and breading and freezing the individual shapes thus produced.

12. The method of making a sea-food product as defined in claim 11 wherein the breaded cut shapes are partially cooked before being frozen.

13. The method defined in claim 11, including the step of forming an opening in the cut shapes and filling the opening with a different type of sea-food.

References Cited in the file of this patent

UNITED STATES PATENTS

| | | |
|---|---|---|
| 921,328 | Young | May 11, 1909 |
| 965,706 | Greiner | July 26, 1910 |
| 1,793,189 | Peters | Feb. 17, 1931 |
| 2,555,232 | Guice et al. | May 29, 1951 |
| 2,630,390 | Carruthers | Mar. 3, 1953 |

OTHER REFERENCES

"Quick Frozen Foods," September 1952, pp. 81 and 82, article entitled Breading Machine Does Job Better.